United States Patent
Jain et al.

(10) Patent No.: US 9,355,086 B2
(45) Date of Patent: May 31, 2016

(54) USER INTERFACE ELEMENTS FOR CONTENT SELECTION AND EXTENDED CONTENT SELECTION

(71) Applicant: MICROSOFT TECHNOLOGY LICENSING, LLC, Redmond, WA (US)

(72) Inventors: Pankaj Jain, Hyderabad (IN); Abhijit Kumar Bairagi, Hyderabad (IN); Bibhu Choudhary, Hyderabad (IN)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 13/648,064

(22) Filed: Oct. 9, 2012

(65) Prior Publication Data

US 2014/0101612 A1 Apr. 10, 2014

(51) Int. Cl.
  *G06F 15/00* (2006.01)
  *G06F 13/00* (2006.01)
  *G06F 17/24* (2006.01)

(52) U.S. Cl.
  CPC .................... *G06F 17/246* (2013.01)

(58) Field of Classification Search
  CPC .................................................. G06F 17/246
  USPC ......... 715/863, 702, 780, 833, 800, 763–765, 715/851–853, 715
  See application file for complete search history.

(56) References Cited

U.S. PATENT DOCUMENTS

| | | |
|---|---|---|
| 5,701,499 A | 12/1997 | Capson et al. |
| 7,647,551 B2 | 1/2010 | Vigesaa et al. |
| 8,584,049 B1 * | 11/2013 | Zhai et al. ..................... 715/863 |
| 2002/0097270 A1 | 7/2002 | Keely et al. |
| 2008/0168388 A1* | 7/2008 | Decker ......................... 715/800 |
| 2008/0174570 A1* | 7/2008 | Jobs et al. ..................... 345/173 |
| 2009/0201248 A1 | 8/2009 | Negulescu et al. |
| 2009/0228842 A1 | 9/2009 | Westerman et al. |
| 2009/0288027 A1 | 11/2009 | Prabakaran |
| 2011/0285651 A1* | 11/2011 | Temple ......................... 345/173 |
| 2012/0013539 A1 | 1/2012 | Hogan et al. |
| 2012/0030566 A1 | 2/2012 | Victor |

OTHER PUBLICATIONS

"Office Reader on Android—Free Office Software on Android", Retrieved on: Aug. 2, 2012, Available at: http://www.kingsoftstore.com/office-reader-free.html.
(Continued)

*Primary Examiner* — Kevin Nguyen
(74) *Attorney, Agent, or Firm* — Julie Kane Akhter; Tom Wong; Micky Minhas

(57) ABSTRACT

A single user interface (UI) handle element is displayed in response to a selection of content. For example, in response to selecting a piece of content (e.g. cell, word, item . . . ), the single UI handle element is displayed near the selection of the content (e.g. near a corner of the selected content). The display of the single UI handle element assists in keeping the display uncluttered as opposed to initially displaying more user interface elements with a content selection. In response to an indication to expand the selection, one or more additional UI handle elements may be displayed to assist the user in changing the selection of content (e.g. an additional handle displayed near another corner of the selection).

20 Claims, 13 Drawing Sheets

(56) References Cited

OTHER PUBLICATIONS

"Microsoft Office Mobile on Windows Phone 7 Product Guide", Retrieved on: Aug. 2, 2012, Available at: http://www.google.com/url?sa=t&rct=j&q=excel%20sheet%20and%20cell%20selection%20and%20mobile%20device%20and%20managing%20handles&source=web&cd=5&ved=0CF4QFjAE&url=http%3A%2F%2Fdownload.microsoft.com%2Fdownload%2F2%2F6%2F2%2F26253C22-D8EC-4230-A3ED-E2DEED9E8EBE%2FMicrosoft%2520Office%2520Mobile%2520on%2520Windows%2520Phone%25207%2520Product%2520Guide.

Wenzel, Elsa, "Microsoft Office Mobile: Hands-On With the Productivity Suite", Published on: Oct. 23, 2010, Available at: http://www.pcworld.com/businesscenter/article/208497-2/microsoft_office_mobile_handson_with_the_productivity_suite.html.

"Overview of Office Mobile for Windows Phone 6.5", Retrieved on: Aug. 6, 2012, Available at: http://www.microsoft.com/windowsphone/en-gb/howto/wp6/work/overview-of-office-mobile-for-windows-phone-6-5.aspx.

Preliminary Report on Patentability for Application No. PCT/US2013/063159 mailed Nov. 11, 2014.

International Search Report and Written Opinion for PCT/US2013/063159 mailed Apr. 4, 2014.

Android 101: How to Copy and Paste, Youtube Video, http://www.youtube.com/watch?v=suMpg3OJYkQ, 1 page (Apr. 12, 2011).

Get a Handle on AutoFill in Excel, hennnnans.com, http://www.hemmans.com/posts/2010/1/5/get-a-handle-on-autofill-in-excel.html, 4 pages (Jan. 5, 2010).

Touch selection in the new Office, Youtube video, http://www.youtube.com/watch?v=ohZyScUCN80, 1 page (Jul. 19, 2012).

* cited by examiner

USER INTERFACE ELEMENTS FOR CONTENT SELECTION AND EXTENDED CONTENT SELECTION

BACKGROUND

When working on many mobile computing devices (e.g. smart phones, tablets) the screen real estate and the input devices available are often limited. As such, performing many common user interactions with documents is challenging. For example, selecting content on a limited display device can be difficult for a user (e.g. selecting cells in a spreadsheet, words, columns, rows, and the like).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A single user interface (UI) handle element is displayed in response to a selection of content. For example, in response to selecting a piece of content (e.g. cell, word, item . . . ), the single UI handle element is displayed near the selection of the content (e.g. near a corner of the selected content). The display of the single UI handle element assists in keeping the display uncluttered as opposed to initially displaying more user interface elements with a content selection. In response to an indication to expand the selection, one or more additional UI handle elements may be displayed to assist the user in changing the selection of content (e.g. an additional handle displayed near another corner of the selection).

DETAILED DESCRIPTION

Figure 1:
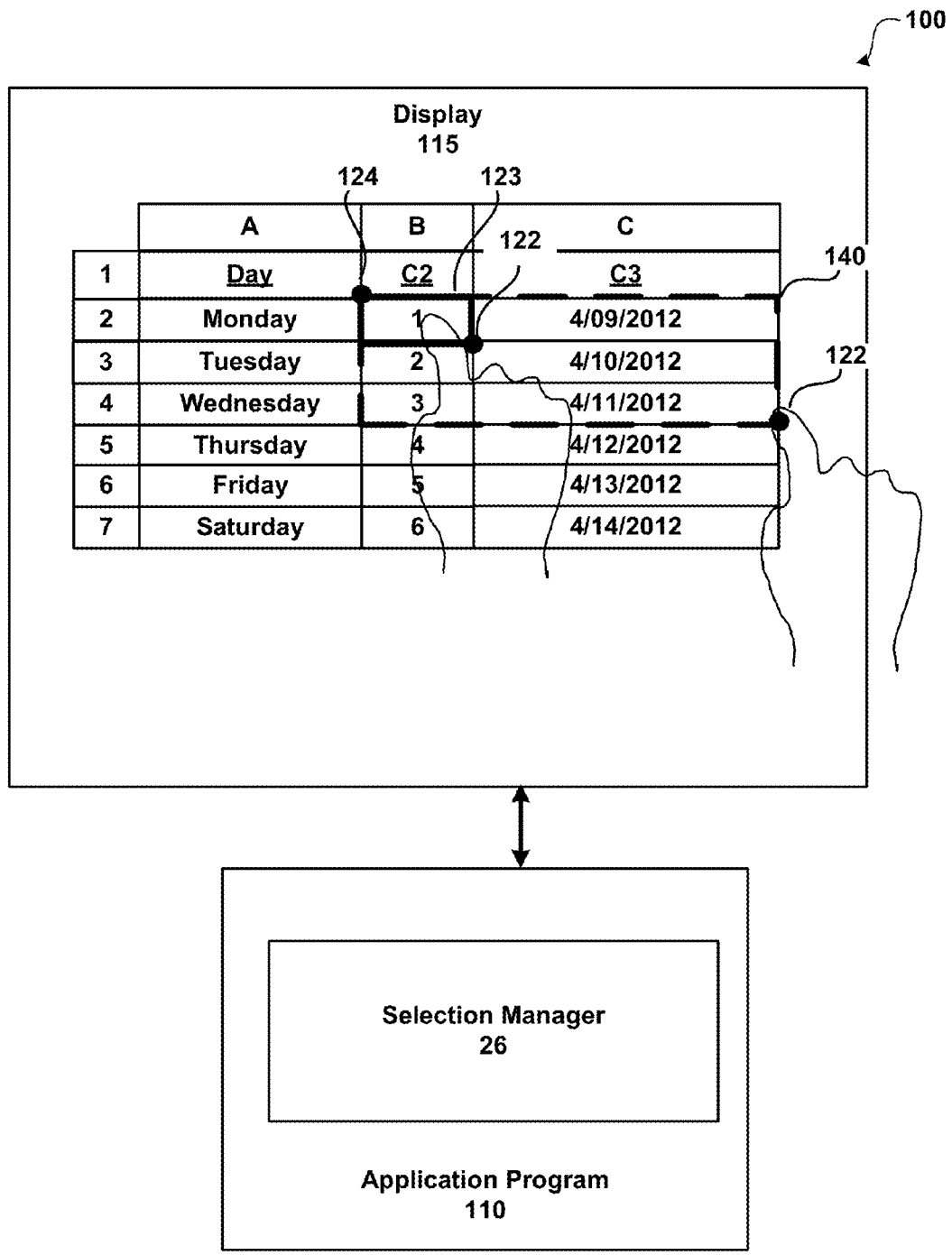
FIG. 1 shows a system including the user interface elements for selecting content.

Referring now to the drawings, in which like numerals represent like elements, various embodiment will be described.

FIG. 1 shows a system including the user interface elements for selecting content. As illustrated, system 100 includes application program 110, selection manager 26 and touch screen input device/display 115.

In order to facilitate communication with the selection manager 26, one or more callback routines, may be implemented. According to one embodiment, application program 110 is a business productivity application that is configured to receive input from a touch-sensitive input device 115 and/or keyboard input (e.g. a physical keyboard and/or SIP). For example, selection manager 26 may provide information to application 110 in response to a user's gesture (i.e. finger on hand 230) selecting content and other touch based gestures. For example, the gesture may include a swiping action and/or dragging action.

System 100 as illustrated comprises a touch screen input device/display 115 that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Selection manager 26 is configured to display UI handle elements (such as handles 122 and 124) to aid in the selection of content. For example, in response to selecting spreadsheet cell 123 (e.g. by tapping cell 123), a first UI handle element 122 is displayed near the corner of the selected content. According to an embodiment, a single UI handle element (e.g. element 122) acts as the initial handle that is used to change a size of the selection. Instead of displaying multiple handles as a result of the selection of cell 123, a single UI handle is displayed such that the display area remains uncluttered and more easily viewed by a user. While UI handle element 122 is displayed as a small circle, other indicators may be displayed to act as a handle (e.g. a small line, arrow, or some other small indicator).

In the current example, the selected cell is distinguished from the other cells by displaying a border around the selected cell. Other methods may be used to distinguish the selected cell (e.g. changing a fill color of the cell, different fill pattern, changing a display of the value, and the like). A user may use handle element 122 to change the selection of the content. For example, the user may drag handle element 122 across cells of the spreadsheet to include more cells (as indicated by area 140). In response to determining that the initial selection is changing, an additional UI handle element 124 is displayed. According to an embodiment, the additional UI handle element 124 is a handle that is displayed near a top left corner of the currently selected area. Instead of showing the second UI handle element (e.g. UI element 124) in response to the initial selection (123), UI handle element 124 is displayed after selection manager 26 determines that the selection of content is changing using UI handle element 122.

Figure 2:
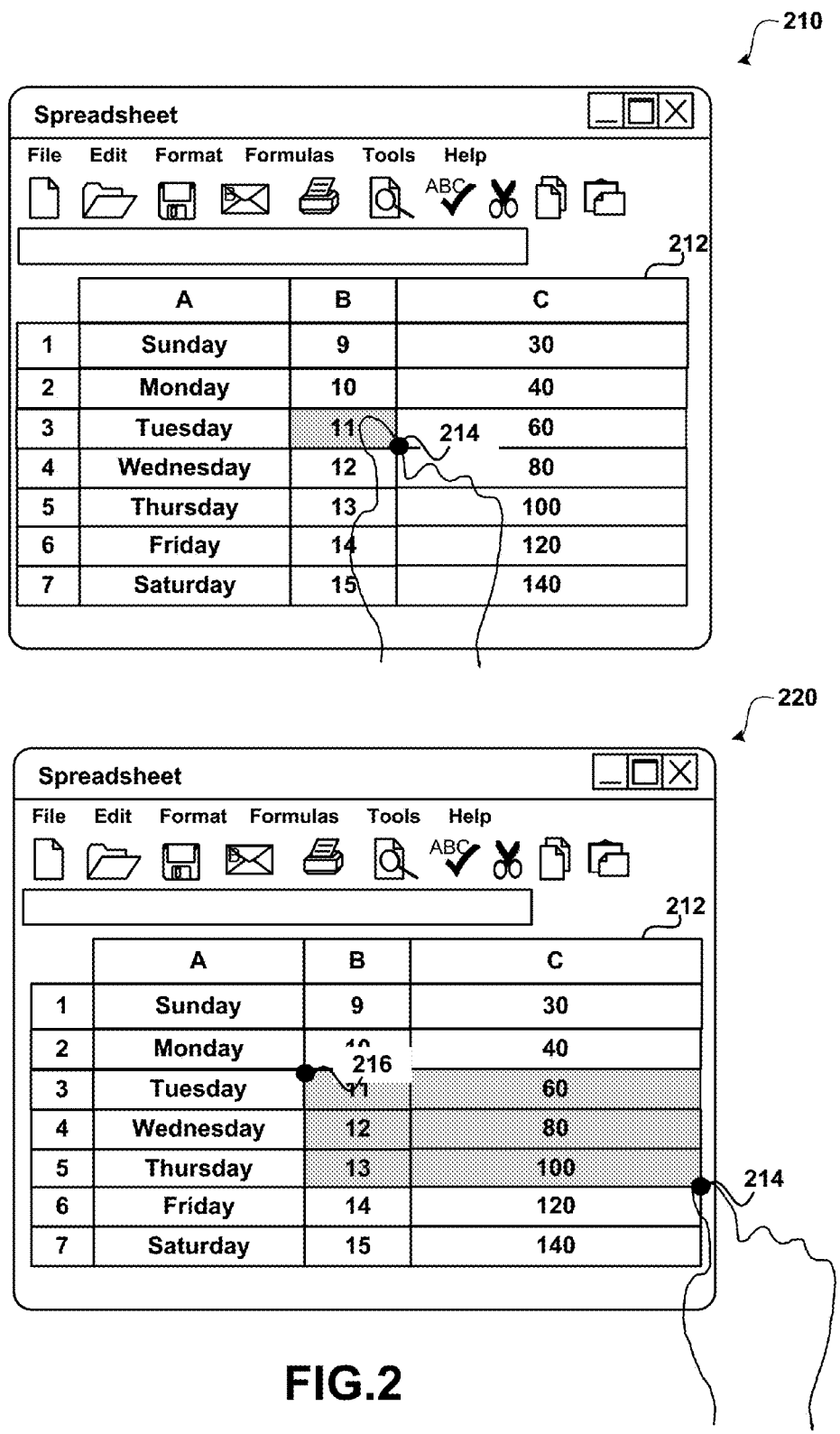
FIG. 2 shows the selection of content within a spreadsheet.

FIG. 2 shows the selection of content within a spreadsheet. As illustrated, FIG. 2 includes two different displays (210 and 220) that illustrate different selections within the spreadsheet. The displays may be shown on a device having a limited display size (e.g. a cell phone having a display of approximately 2 by 3 inches, a slate/tablet having approximately a 7-10 inch display, and/or other devices having other display sizes (e.g. 4, 5, 6 inches). The displays may also be shown on a touch screen. Non-limited display sizes may also be utilized.

Display 210 shows an initial selection of a cell. According to an embodiment, a user first selects a cell that is used as a starting point for selecting other cells. In the current example, the user has selected cell B3 using one of their fingers. As a result of the selection, cell B3 is highlighted to indicate the selection. In response to the initial selection, UI handle element 214 is displayed that acts as a handle that the user may move to adjust the current selection. UI handle element 214 may be moved in any direction (e.g. up, down, left, right, diagonally).

Display 220 shows the user dragging UI handle element 214 down and across display 220 to the corner of the cell at location C5. UI handle element 216 is displayed in response to a determination that the current selection is being changed. The user may use handle element 214 and/or handle element 216 to adjust a size of the currently selected area.

Figure 3A:
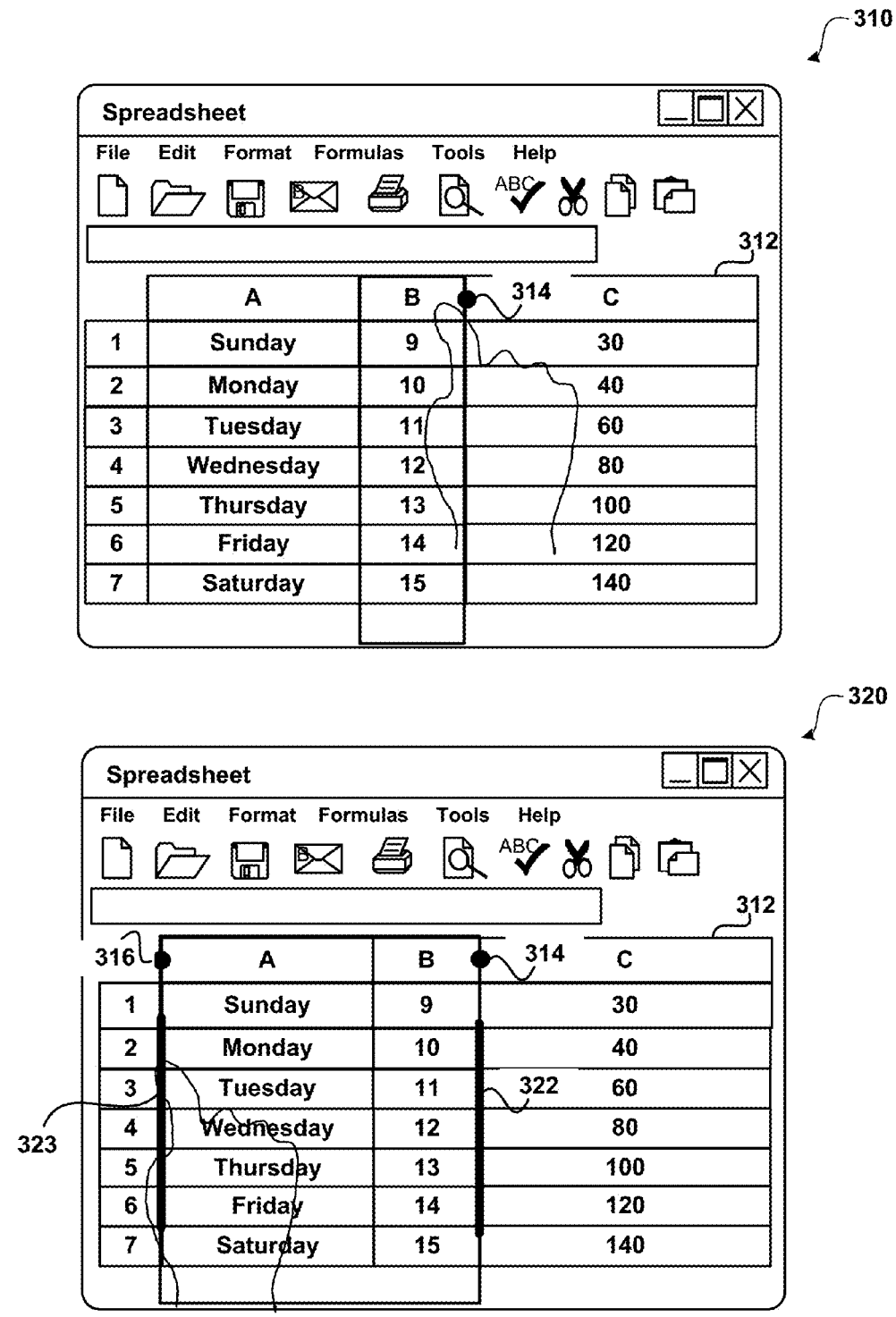
FIGS. 3A and 3B shows the selection of columns and rows within a spreadsheet.
Figure 3B:
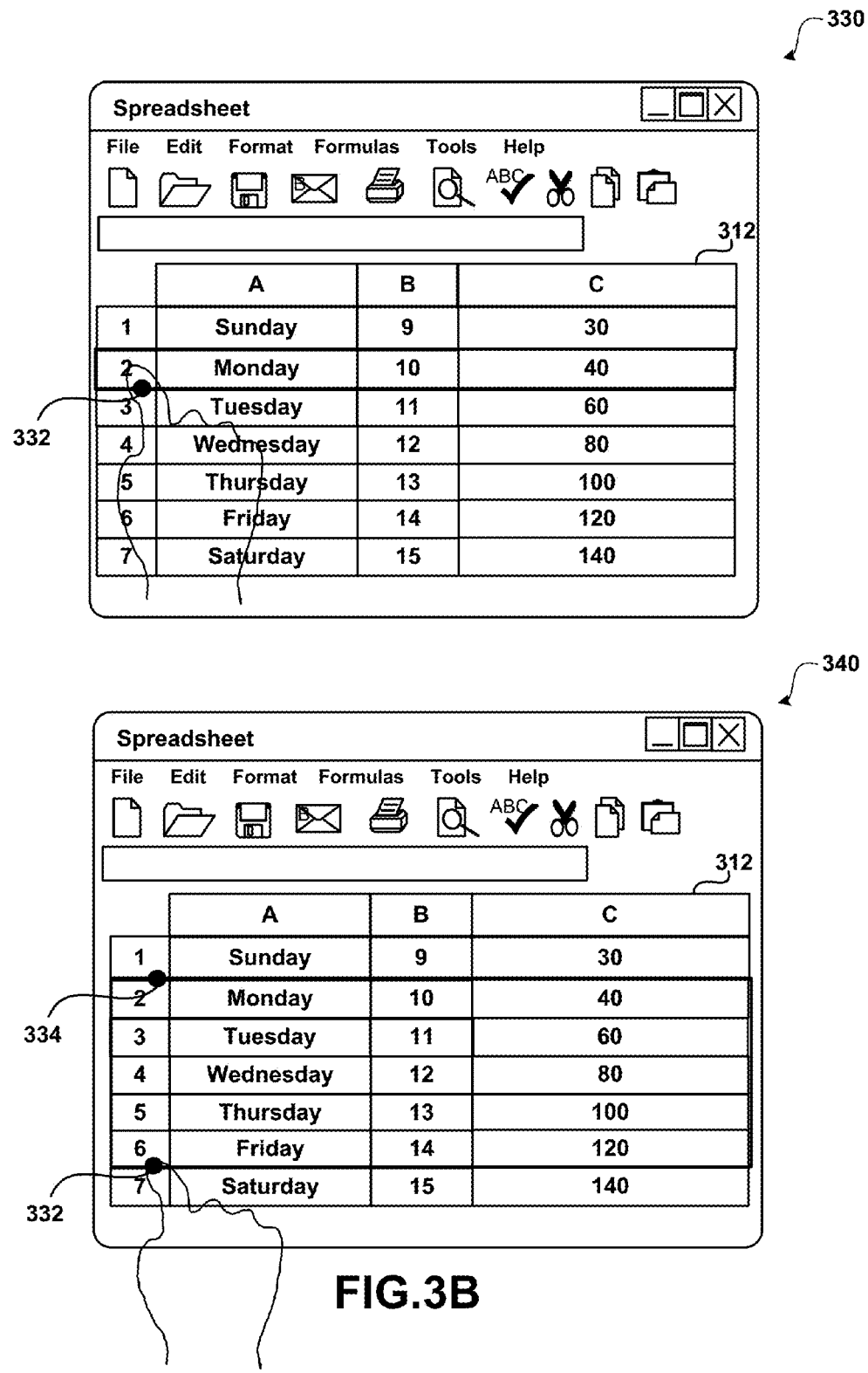

FIGS. 3A and 3B shows the selection of columns and rows within a spreadsheet. As illustrated, FIG. 3A includes two different displays (310 and 320) that illustrate different selections within the spreadsheet.

Display 310 shows an initial selection of a column. According to an embodiment, a user first selects a column that is used as a starting point for selecting other columns. In the current example, the user has selected column B by tapping on the column header B. As a result of the selection, column B is indicated to be selected. In the current example, a border has been displayed around column B. In response to the initial selection, UI handle element 314 is displayed that acts as a handle that the user may move to adjust the current selection. UI element 314 may be moved to select a different number of columns.

Display 320 shows the user dragging UI handle element 314 across display 320 to column A. UI handle element 316 is displayed in response to a determination that the current column selection is being changed. The user may use handle 314 and/or 316 to adjust a size of the currently selected columns. According to an embodiment, additional UI elements (e.g. 322, 323) may be used to change the currently selected area. For example, a user may drag handle element 322 and/or handle element 323 to change the current number of columns selected.

As illustrated, FIG. 3B includes two different displays (330 and 340) that illustrate different selections within the spreadsheet.

Display 330 shows an initial selection of a row. According to an embodiment, a user first selects a row that is used as a starting point for selecting other rows. In the current example, the user has selected row 2 by tapping on the row indicator "2". As a result of the selection, row 2 is indicated to be selected. In the current example, a border has been displayed around row 2. In response to the initial selection, UI handle element 332 is displayed that acts as a handle that the user may move to adjust the current selection. UI element 332 may be moved to select a different number of rows.

Display 340 shows the user dragging UI handle element 332 down display 340 to the end of row 6. UI element 334 is displayed in response to a determination that the current row selection is being changed. The user may use handle element 332 and/or handle element 334 to adjust a size of the currently selected rows. According to an embodiment, additional UI elements (not shown) may be used to change the currently selected number of rows.

Figure 4:
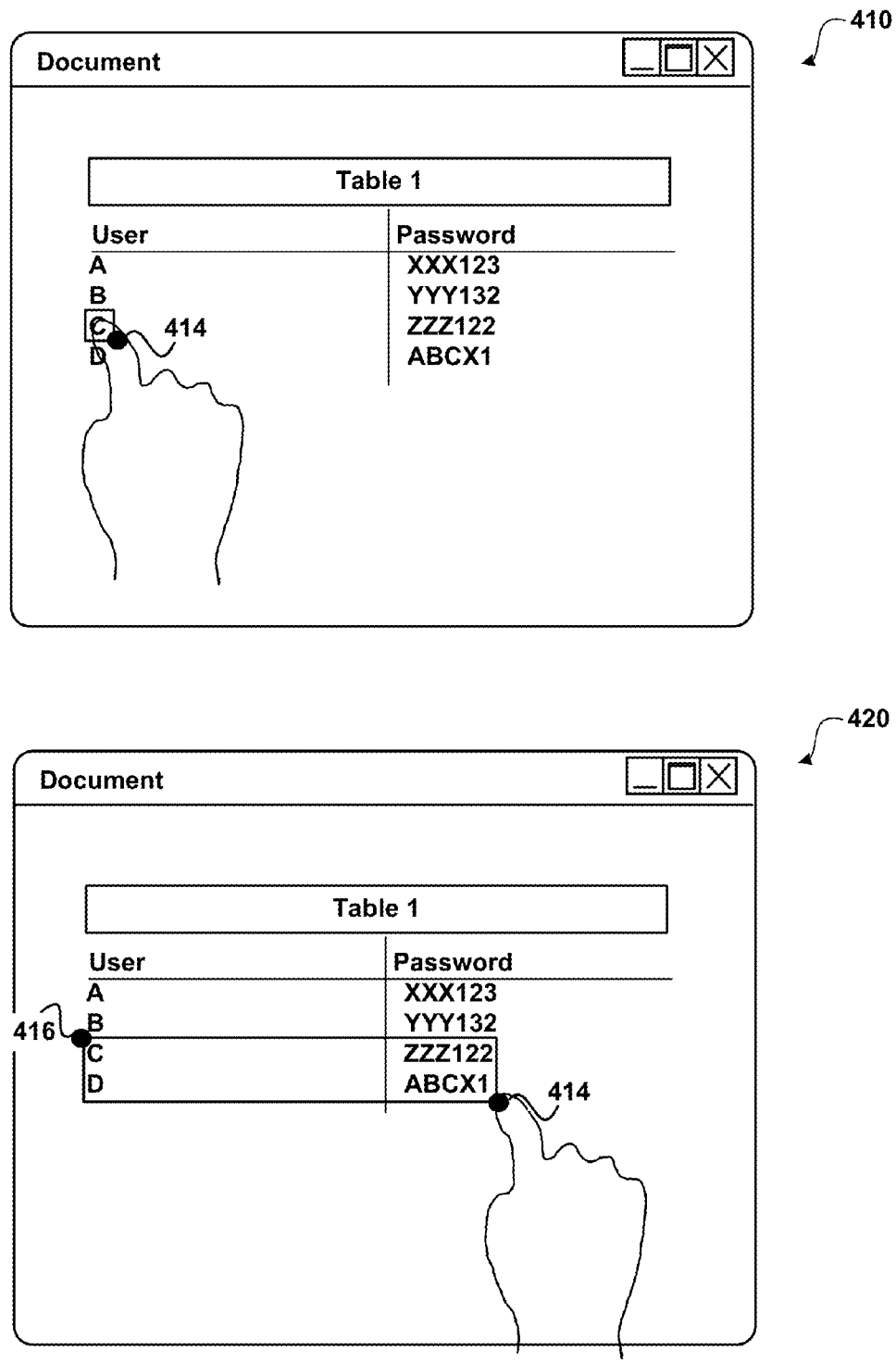
FIG. 4 shows the selection of content within a table.

FIG. 4 shows the selection of content within a table. As illustrated, FIG. 4 includes two different displays (410 and 420) that illustrate different selections within the table.

Display 410 shows an initial selection of content (e.g. "C") within the table. According to an embodiment, a user first selects content that is used as a starting point for the selection of other content. In the current example, the user has selected "C" by tapping. As a result of the selection, the content "C" is indicated to be selected. In the current example, a border has been displayed.

Display 420 shows the user dragging UI handle element 414 across content displayed within the table. UI element 416 is displayed in response to a determination that the user is changing the selection of content within the table. The user may use handle element 414 and/or handle element 416 to adjust a size of the currently selected content within the table.

Figure 5:
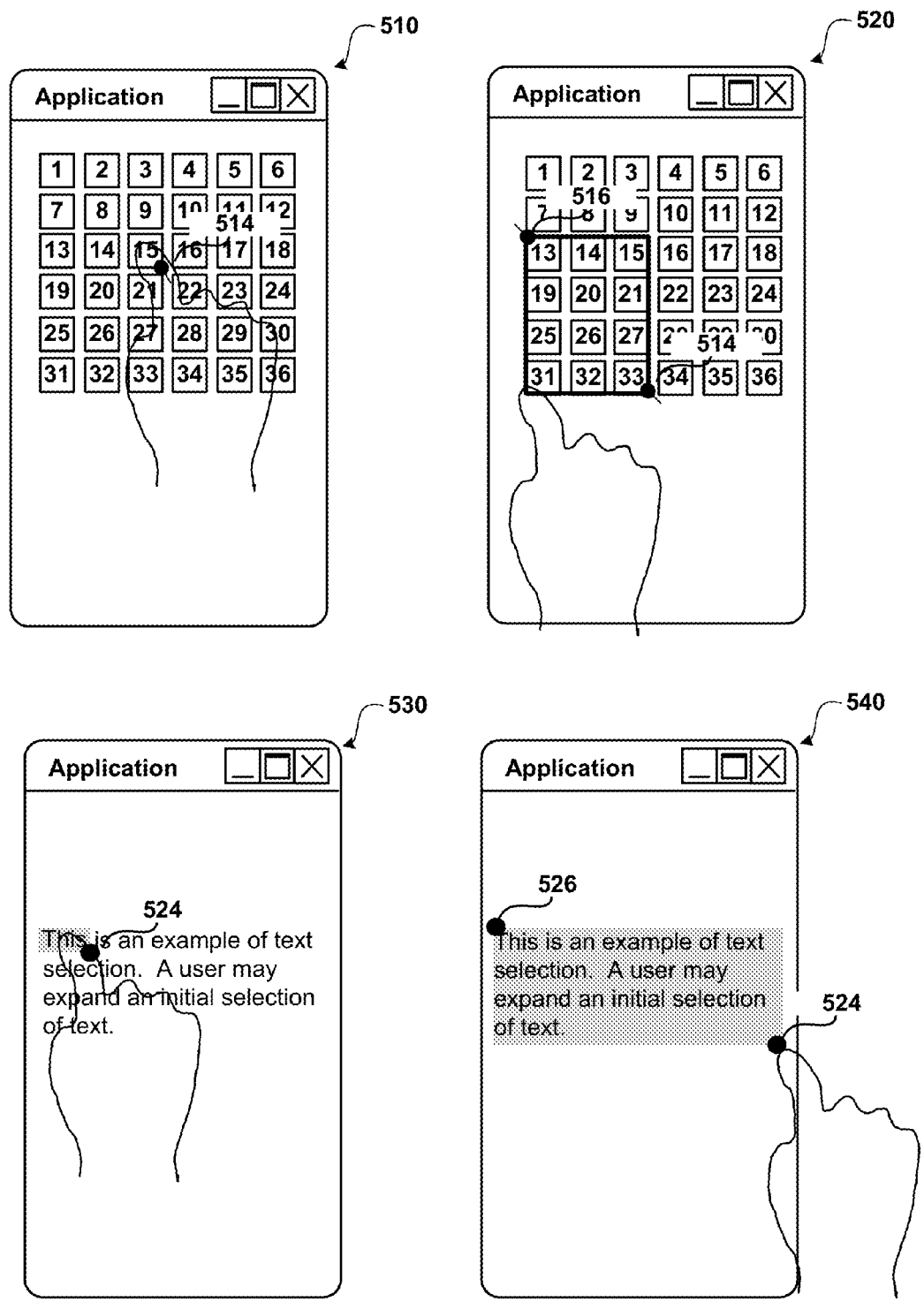
FIG. 5 shows selection of different type of content.

FIG. 5 shows selection of different types of content. As illustrated, FIG. 5 includes four different displays (510, 520, 530 and 540) that illustrate selections of different content.

Displays 510 and 520 illustrate selecting different content that is arranged in a structured format. For example, the content may correspond to images, files, folders, and the like.

Display 510 shows an initial selection of content (e.g. item "15"). In the current example, the user has selected item 15. As a result of the selection, a UI handle element 514 is displayed near the corner of the selected content. In the current example, selected content 15 is not shown differently from non-selected content except for the display of UI handle element 514.

Display 520 shows the user dragging UI handle element 514 across the content. UI handle element 516 is displayed in response to a determination that the user is changing the selection of content. The user may use handle element 514 and/or handle element 516 to adjust a size of the currently selected content within the table.

Displays 530 and 540 illustrate selecting text content that is arranged in lines and/or paragraphs.

Display 530 shows an initial selection of content (e.g. "This"). In the current example, the user has selected the word "This" which is highlighted. As a result of the selection, a UI handle element 524 is displayed near the corner of the selected content.

Display 540 shows the user dragging UI handle element 524 across the content. UI handle element 526 is displayed in response to a determination that the user is changing the selection of content. The user may use handle element 524 and/or handle element 526 to adjust a size of the currently selected content within the table.

Figure 6:
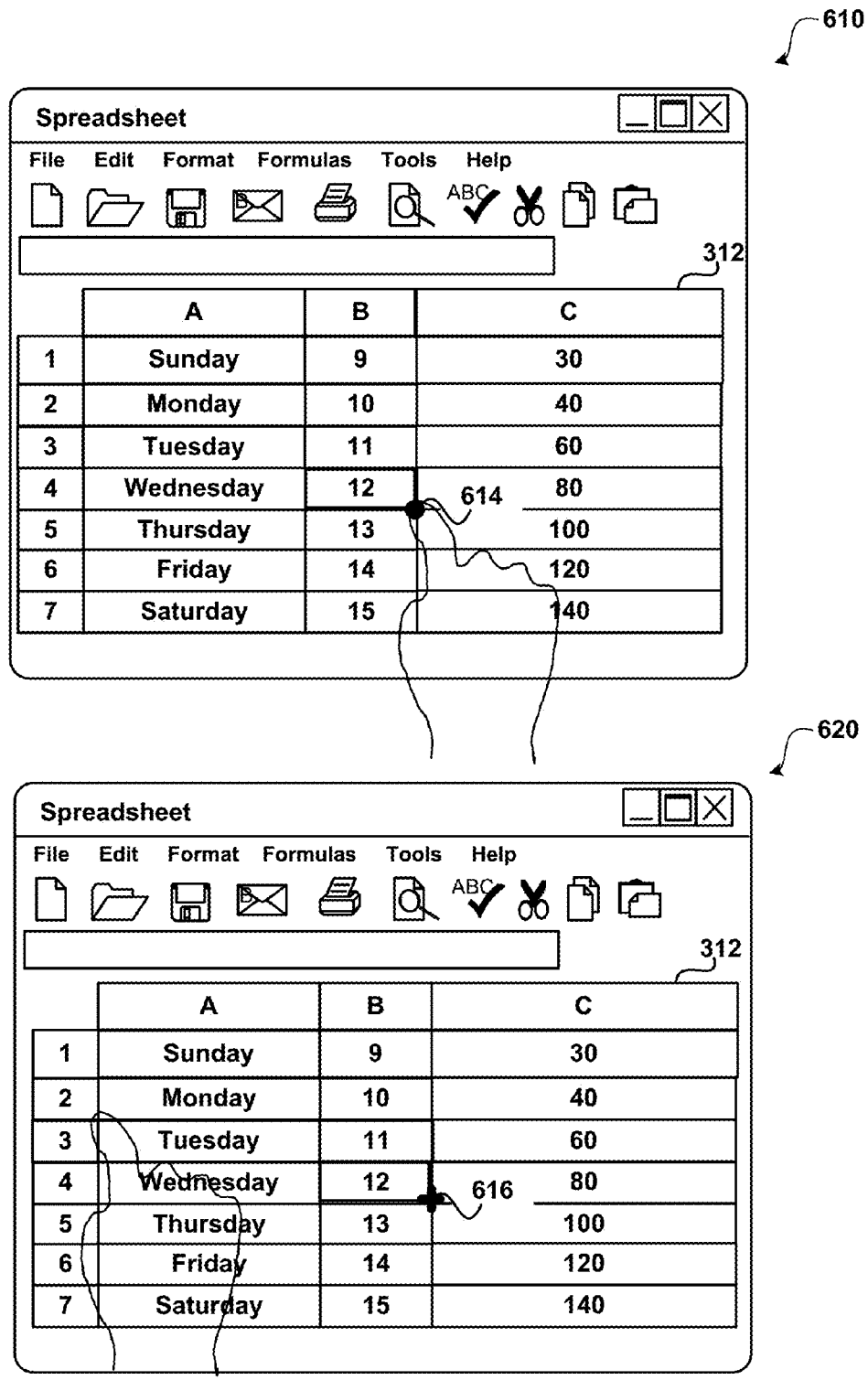
FIG. 6 shows the selection of content and changing the selection to a different action.

FIG. 6 shows the selection of content and changing the selection to a different action. As illustrated, FIG. 6 includes two different displays (610 and 620).

Display 610 shows an initial selection of content (e.g. "12"). As a result of the selection, a UI handle element 614 is displayed near the corner of the selected content.

Display 620 shows the user using a touch gesture (e.g. tapping/pressing on UI handle element 614) to change the UI handle element to a different type of UI element (e.g. an auto fill element). As can be seen, the graphical icon changes from a small circle to a small "+" to indicate the change in functionality.

Figure 7:
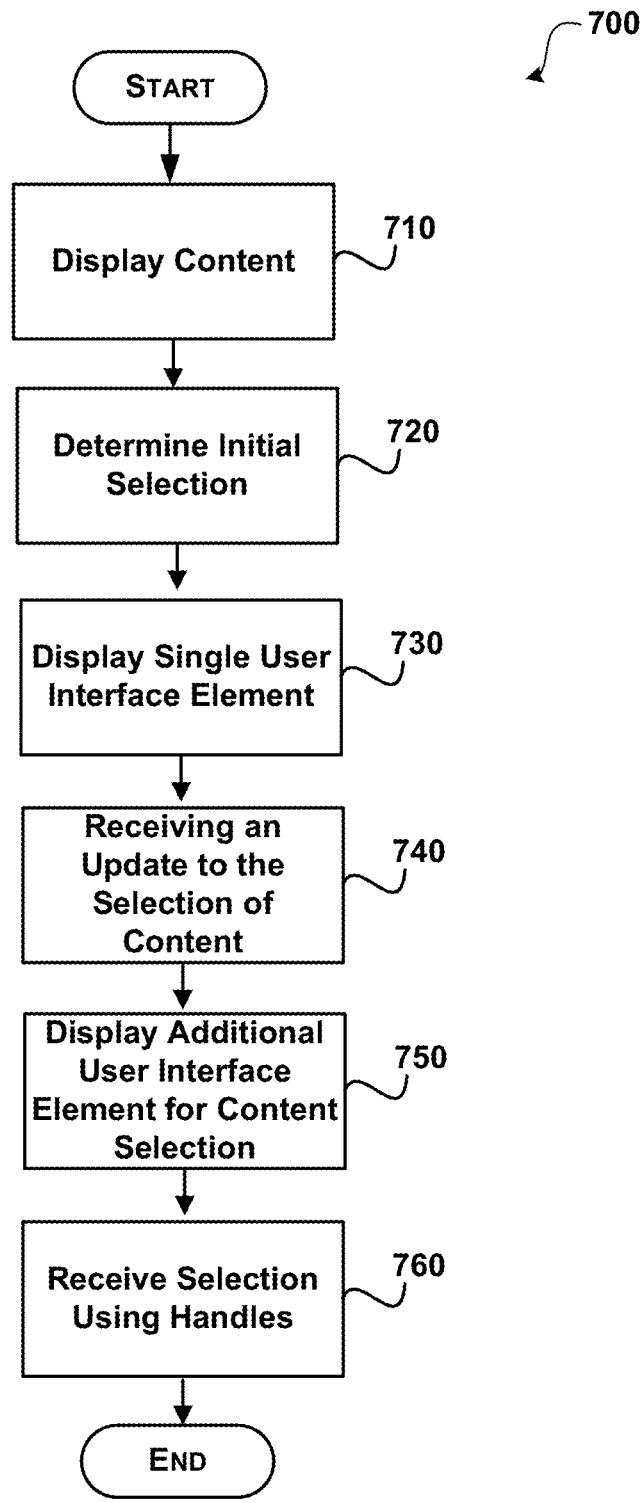
FIG. 7 shows and illustrative processes for displaying user interface handle elements to assist in selecting content.

FIG. 7 shows and illustrative processes for displaying user interface handle elements to assist in selecting content. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process moves to operation 710, where content is displayed. The content displayed may be different types of contents. For example, the content may be a spreadsheet, a document, a table, images, files, and the like. Generally, the content that is displayed may be any type of content that is displayed in a structured manner (e.g. cells, rows, columns, tabular data . . . ).

Flowing to operation 720, an initial selection of content is determined According to an embodiment, a touch input is received indicating a selection of content. For example, a user taps at least a portion of a finger on the touch surface to select content (e.g. a word, a cell, an element, or some other content). According to an embodiment, content is selected based on touch detection detected within a virtual size surrounding the content (e.g. if a finger is within a predetermined tolerance of a size of the displayed content). For example, even if the user's finger is detected slightly below the bottom border of the cell, the cell above the actual selection may be selected. Additionally, according to some embodiments, the user may only have to place their finger (or some other object) near the surface of the touch surface for touch input to be received and detected.

Moving to operation 730, a single UI handle element is displayed near the selected content. According to an embodiment a small icon that represents a "handle" is displayed near the bottom right of the selected content. A graphical indicator may be used to distinguish the current selection from unselected content. For example, a border around the selected content may be displayed to indicate the current selection. Other graphical indicators may also be used. For example, a coloring/shading of the selected content may be used to differentiate the current selection.

Moving to operation 740, a determination is made that the current selection is being updated. For example, a user may have selected the single UI handle element and is dragging the handle across other content.

Flowing to operation 750, a second UI handle element is displayed in addition to the first UI handle element. According to an embodiment, the second UI handle element is placed near the top left corner of the current selection. Other additional handle elements may also be displayed (e.g. one or more sides of a graphical bounding box may be used as a handle).

Transitioning to operation 760, the current selection may be changed using any of the displayed handles.

The process then flows to an end operation and returns to processing other actions.

Figure 8:
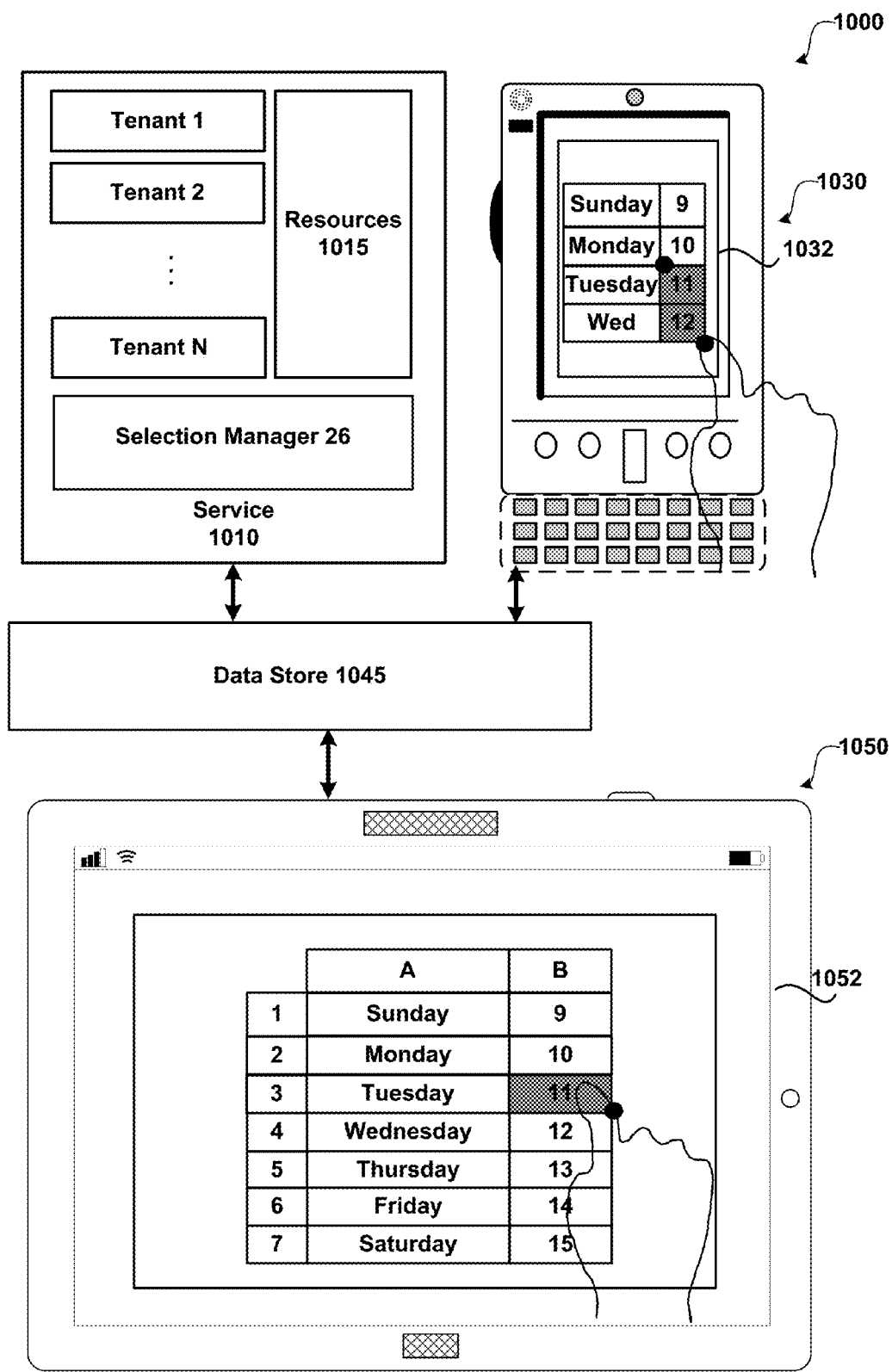
FIG. 8 illustrates an exemplary system for selecting content using different devices.

FIG. 8 illustrates an exemplary system for selecting content using different devices. As illustrated, system 1000 includes service 1010, data store 1045, touch screen input device/display 1050 (e.g. a slate) and smart phone 1030.

As illustrated, service 1010 is a cloud based and/or enterprise based service that may be configured to provide services, such as productivity services (e.g. MICROSOFT OFFICE 365 or some other cloud based/online service that is used to interact with items (e.g. messages, spreadsheets, documents, charts, and the like). The service may be interacted with using different types of input/output. For example, a user may use touch input, hardware based input, speech input, and the like. The service may provide speech output that combines pre-recorded speech and synthesized speech. Functionality of one or more of the services/applications provided by service 1010 may also be configured as a client/server based application. For example, a client device may include an application that is created using platform neutral components and application specific components. Although system 1000 shows a service relating to productivity applications, other services/applications may be configured.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device/display 1050 (e.g. a slate/tablet device) and smart phone 1030 that detects when a touch input has been received (e.g. a finger touching or nearly touching the touch screen). The platforms may be the same type of platform and/or different types of platforms. Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micromachined accelerometers, piezoelectric devices, capacitive sensors, resistive sensors, inductive sensors, laser vibrometers, and LED vibrometers.

According to an embodiment, smart phone 1030 and touch screen input device/display 1050 are configured with different applications.

As illustrated, touch screen input device/display 1050 and smart phone 1030 shows exemplary displays 1052/1032 showing the use of an application in which content is selected. Data may be stored on a device (e.g. smart phone 1030, slate 1050 and/or at some other location (e.g. network data store 1045). The applications used by the devices may be client based applications, server based applications, cloud based applications and/or some combination.

Selection manager 26 is configured to perform operations relating to displaying UI handle elements and selecting content. While manager 26 is shown within service 1010, the functionality of the manager may be included in other locations (e.g. on smart phone 1030 and/or slate device 1050).

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 9:
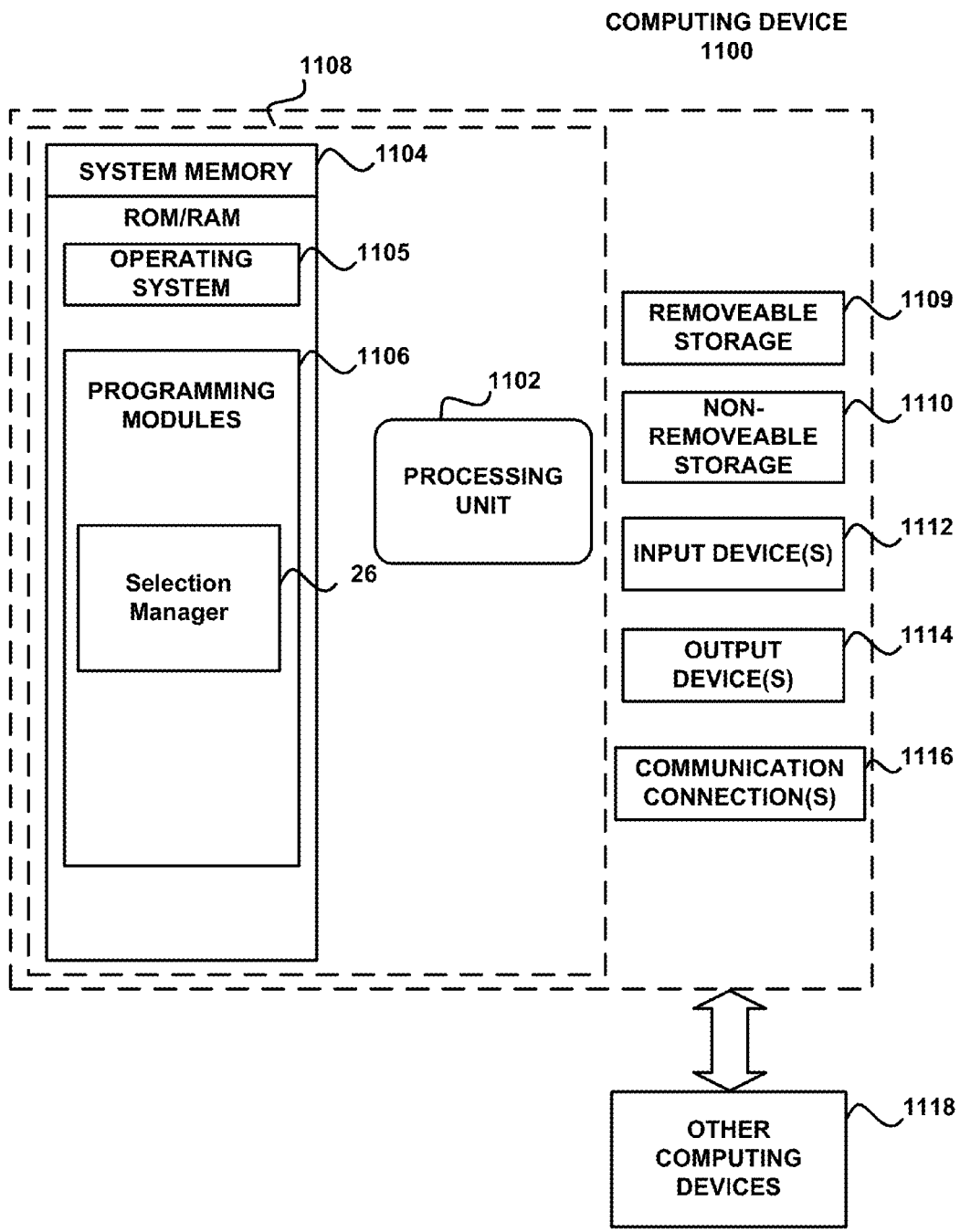
FIGS. 9-11 and the associated descriptions provide a discussion of a variety of operating environments in which embodiments of the invention may be practiced.
Figure 10A:
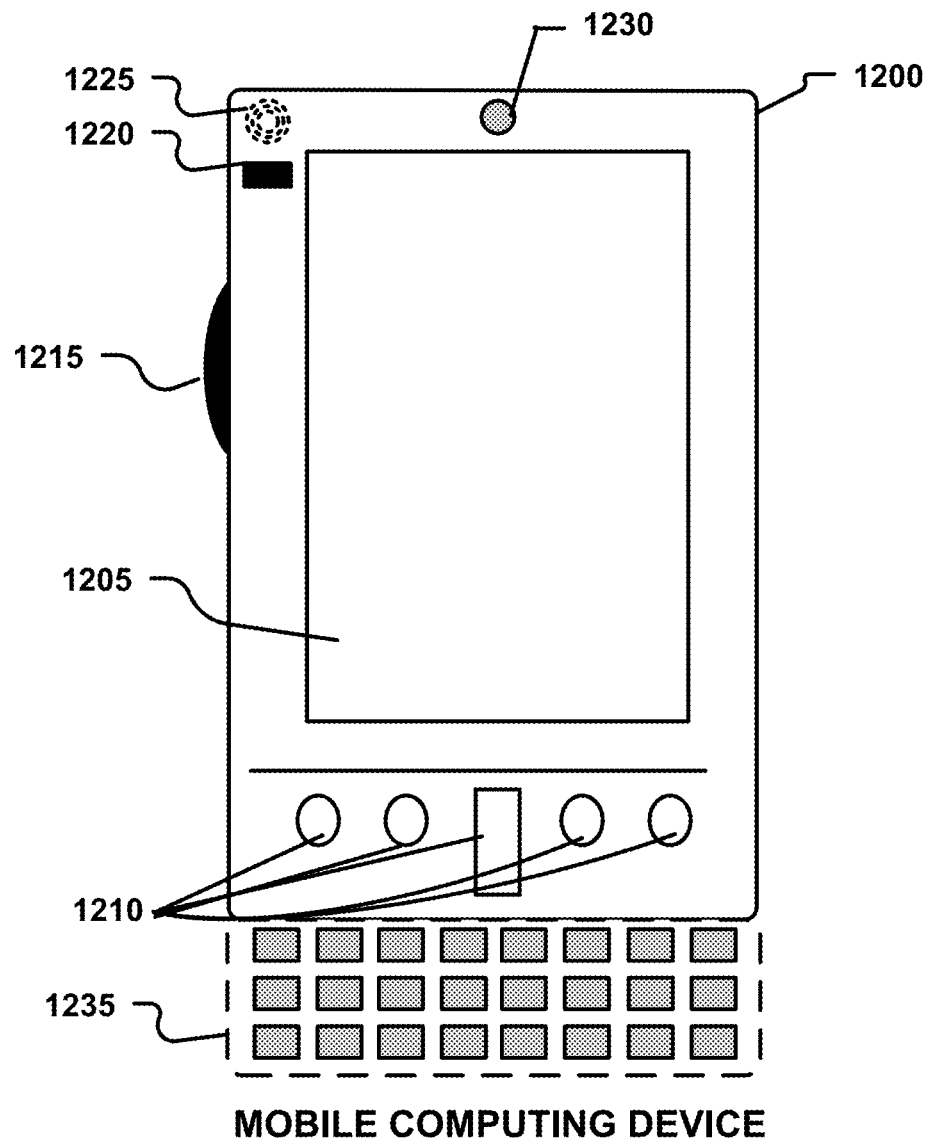
Figure 10B:
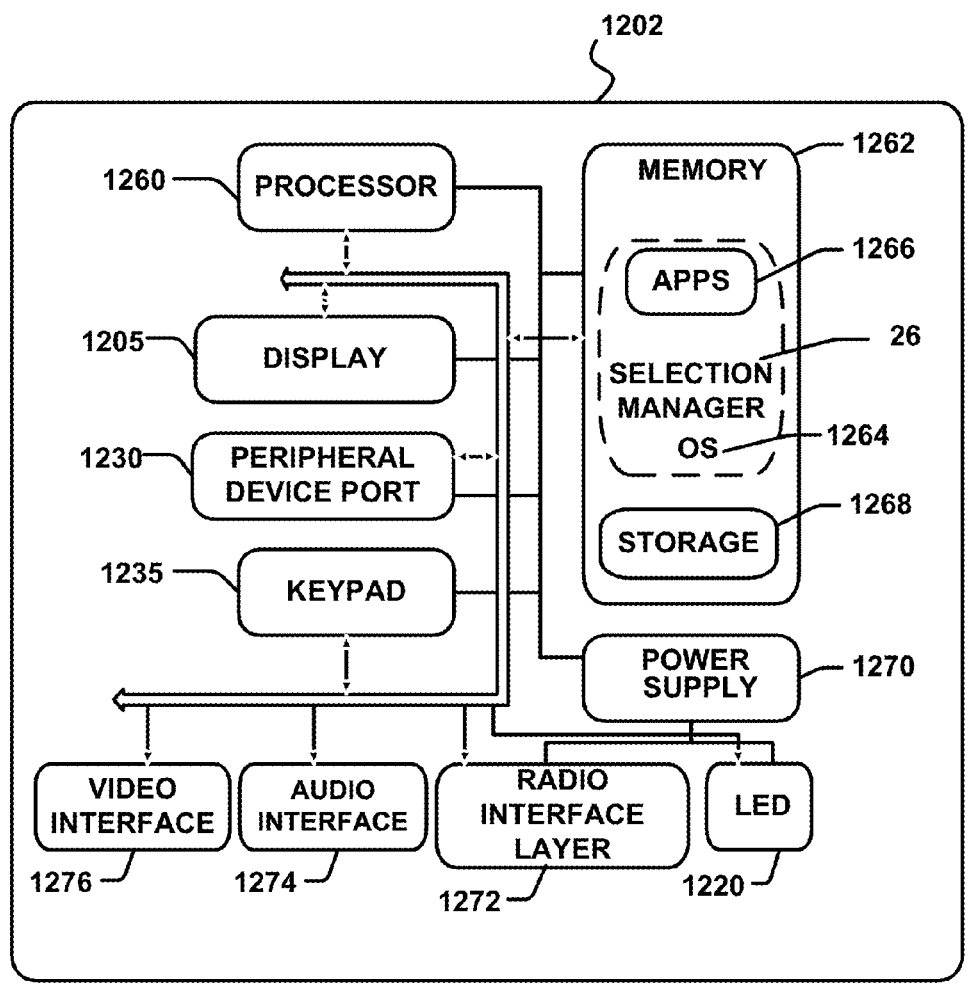
Figure 11:
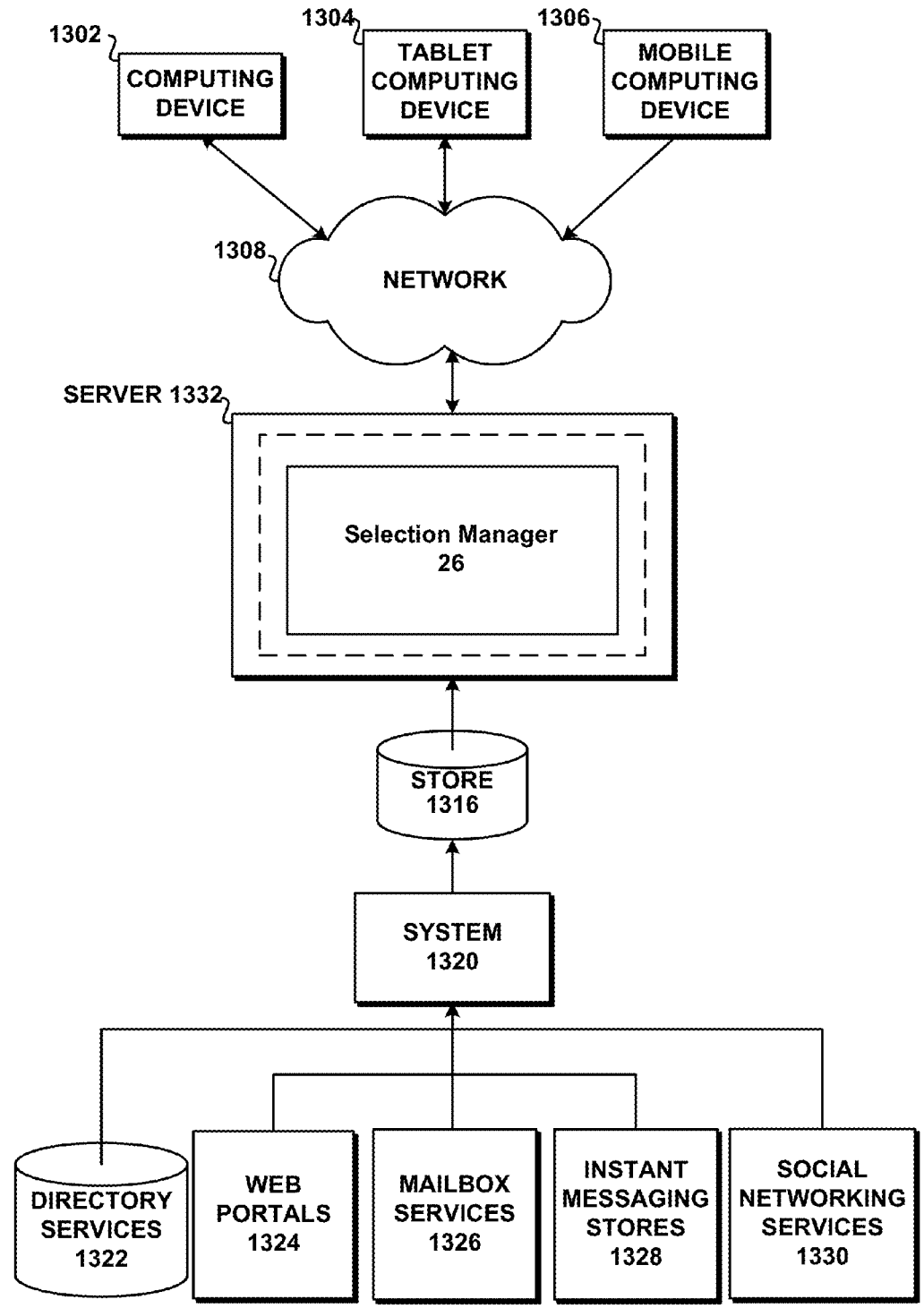

FIGS. 9-11 and the associated descriptions provide a discussion of a variety of operating environments in which embodiments of the invention may be practiced. However, the devices and systems illustrated and discussed with respect to FIGS. 9-11 are for purposes of example and illustration and are not limiting of a vast number of computing device configurations that may be utilized for practicing embodiments of the invention, described herein.

FIG. 9 is a block diagram illustrating example physical components of a computing device 1100 with which embodiments of the invention may be practiced. The computing device components described below may be suitable for the computing devices described above. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1120. Operating system 1105, for example, may be suitable for controlling computing device 1100's operation. In one embodiment, programming modules 1106 may include a selection manager 26, as described above, installed on computing device 1100. Furthermore, embodiments of the invention may be practiced in conjunction with a graphics library, other operating systems, or any other application program and is not limited to any particular application or system. This basic configuration is illustrated in FIG. 9 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated by a removable storage 1109 and a non-removable storage 1110.

As stated above, a number of program modules and data files may be stored in system memory 1104, including operating system 1105. While executing on processing unit 1102, programming modules 1106, such as the manager may perform processes including, for example, operations related to method 900 as described above. The aforementioned process is an example, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10A and 10B illustrate a suitable mobile computing environment, for example, a mobile telephone, a smartphone, a tablet personal computer, a laptop computer, and the like, with which embodiments of the invention may be practiced. With reference to FIG. 10A, an example mobile computing device 1200 for implementing the embodiments is illustrated. In a basic configuration, mobile computing device 1200 is a handheld computer having both input elements and output elements. Input elements may include touch screen display 1205 and input buttons 1215 that allow the user to enter information into mobile computing device 1200. Mobile computing device 1200 may also incorporate an optional side input element 1215 allowing further user input. Optional side input element 1215 may be a rotary switch, a button, or any other type of manual input element. In alternative embodiments, mobile computing device 1200 may incorporate more or less input elements. For example, display 1205 may not be a touch screen in some embodiments. In yet another alternative embodiment, the mobile computing device is a portable phone system, such as a cellular phone having display 1205 and input buttons 1215. Mobile computing device 1200 may also include an optional keypad 1235. Optional keypad 1215 may be a physical keypad or a "soft" keypad generated on the touch screen display.

Mobile computing device 1200 incorporates output elements, such as display 1205, which can display a graphical user interface (GUI). Other output elements include speaker 1225 and LED light 1220. Additionally, mobile computing device 1200 may incorporate a vibration module (not shown), which causes mobile computing device 1200 to vibrate to notify the user of an event. In yet another embodiment, mobile computing device 1200 may incorporate a headphone jack (not shown) for providing another means of providing output signals.

Although described herein in combination with mobile computing device 1200, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 10B is a block diagram illustrating components of a mobile computing device used in one embodiment, such as the computing device shown in FIG. 10A. That is, mobile computing device 1200 can incorporate system 1202 to implement some embodiments. For example, system 1202 can be used in implementing a "smart phone" that can run one or more applications similar to those of a desktop or notebook computer such as, for example, browser, e-mail, scheduling, instant messaging, and media player applications. In some embodiments, system 1202 is integrated as a computing device, such as an integrated personal digital assistant (PDA) and wireless phoneme.

One or more application programs 1266 may be loaded into memory 1262 and run on or in association with operating system 1264. Examples of application programs include phoneme dialer programs, e-mail programs, PIM (personal information management) programs, word processing programs, spreadsheet programs, Internet browser programs, messaging programs, and so forth. System 1202 also includes non-volatile storage 1268 within memory 1262. Non-volatile storage 1268 may be used to store persistent information that should not be lost if system 1202 is powered down. Applications 1266 may use and store information in non-volatile storage 1268, such as e-mail or other messages used by an e-mail application, and the like. A synchronization application (not shown) may also reside on system 1202 and is programmed to interact with a corresponding synchronization application resident on a host computer to keep the information stored in non-volatile storage 1268 synchronized with corresponding information stored at the host computer. As should be appreciated, other applications may be loaded into memory 1262 and run on the device 1200, including the selection manager 26, described above.

System 1202 has a power supply 1270, which may be implemented as one or more batteries. Power supply 1270 might further include an external power source, such as an AC adapter or a powered docking cradle that supplements or recharges the batteries.

System 1202 may also include a radio 1272 that performs the function of transmitting and receiving radio frequency communications. Radio 1272 facilitates wireless connectivity between system 1202 and the "outside world", via a communications carrier or service provider. Transmissions to and from radio 1272 are conducted under control of OS 1264. In other words, communications received by radio 1272 may be disseminated to application programs 1266 via OS 1264, and vice versa.

Radio 1272 allows system 1202 to communicate with other computing devices, such as over a network. Radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1202 is shown with two types of notification output devices; LED 1220 that can be used to provide visual notifications and an audio interface 1274 that can be used with speaker 1225 to provide audio notifications. These devices may be directly coupled to power supply 1270 so that when activated, they remain on for a duration dictated by the notification mechanism even though processor 1260 and other components might shut down for conserving battery power. LED 1220 may be programmed to remain on indefinitely until the user takes action to indicate the powered-on status of the device. Audio interface 1274 is used to provide audible signals to and receive audible signals from the user. For example, in addition to being coupled to speaker 1225, audio interface 1274 may also be coupled to a microphone 1220 to receive audible input, such as to facilitate a telephone conversation. In accordance with embodiments of the present invention, the microphone 1220 may also serve as an audio sensor to facilitate control of notifications, as will be described below. System 1202 may further include video interface 1276 that enables an operation of on-board camera 1230 to record still images, video stream, and the like.

A mobile computing device implementing system 1202 may have additional features or functionality. For example, the device may also include additional data storage devices (removable and/or non-removable) such as, magnetic disks, optical disks, or tape. Such additional storage is illustrated in FIG. 10B by storage 1268. Computer storage media may include volatile and nonvolatile, removable and non-removable media implemented in any method or technology for storage of information, such as computer readable instructions, data structures, program modules, or other data.

Data/information generated or captured by the device 1200 and stored via the system 1202 may be stored locally on the device 1200, as described above, or the data may be stored on any number of storage media that may be accessed by the device via the radio 1272 or via a wired connection between the device 1200 and a separate computing device associated with the device 1200, for example, a server computer in a distributed computing network such as the Internet. As should be appreciated such data/information may be accessed via the device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 11 illustrates a system architecture for an application using handle elements for selecting content.

Components managed via the selection manager 26 may be stored in different communication channels or other storage types. For example, components along with information from which they are developed may be stored using directory services 1322, web portals 1324, mailbox services 1326, instant messaging stores 1328 and social networking sites 1330. The systems/applications 26, 1320 may use any of these types of systems or the like for enabling management and storage of components in a store 1316. A server 1332 may provide communications and services relating to creating an application using shared code across different platforms. Server 1332 may provide services and content over the web to clients through a network 1308. Examples of clients that may utilize server 1332 include computing device 1302, which may include any general purpose personal computer, a tablet computing device 1304 and/or mobile computing device 1306 which may include smart phones. Any of these devices may obtain display component management communications and content from the store 1316.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended

What is claimed is:

1. A method for selecting content, comprising:
   displaying content within a graphical display;
   receiving a selection of content;
   in response to determining that content is initially selected, displaying a single user interface (UI) handle element near the selection of content;
   receiving an update to the area of the selection of content using the single UI handle element; and
   in response to receiving the update to the area of the selection of content:
   displaying the single UI handle element at a first edge of the updated area of the selection of content; and
   displaying a second UI handle element at a second edge of the updated area of the selection of content,
   wherein the single UI handle element and the second UI handle element are used to adjust the updated area of the selection of content.

2. The method of claim 1, further comprising displaying a border around the selection of content.

3. The method of claim 1, further comprising displaying a selectable border around the selected content to expand the area of the selection of content.

4. The method of claim 1, wherein receiving the update to the area of the selection of content using the single user interface element comprises receiving a touch based gesture that moves the single UI handle element across other content.

5. The method of claim 1, further comprising in response to a selection of a column header, displaying a border around the selected column and displaying the single UI handle element at an edge of the selected column header.

6. The method of claim 1, further comprising in response to a selection of a row header, displaying a border around the selected row and the single UI handle element at an edge of the selected row.

7. The method of claim 1, wherein the selection is a selection of content comprising any one of: a line of a document, a cell, and an element of a table.

8. The method of claim 1, further comprising receiving a touch gesture on the single UI handle element that changes the single UI handle element to an auto fill UI element.

9. A computer-readable medium, not including a signal, storing computer-executable instructions for selecting content, comprising:
   displaying content within a spreadsheet in a graphical display;
   determining when a cell in the spreadsheet is initially selected;

in response to determining that the cell in the spreadsheet is initially selected, displaying a single user interface (UI) handle element near a corner of the cell;

receiving an update to the area of the selection using the single UI element; and in response to receiving the update to the area of the selection:

displaying a single UI handle element at a first corner of a first cell in the updated area of the selection; and displaying a second UI handle element near a second corner of a second cell the updated area of the selection, wherein the single UI handle element and the second UI handle element are used to adjust the updated area of the selection.

10. The computer-readable medium of claim 9, further comprising changing a display of the selection that distinguishes the selection from non-selected content.

11. The computer-readable medium of claim 9, further comprising displaying a border around the selection and using at least one of the edges of the border as an additional handle element.

12. The computer-readable medium of claim 9, wherein receiving the update to the area of the selection of content using the single user interface element comprises receiving a touch based gesture that moves the single UI handle element across other content.

13. The computer-readable medium of claim 9, further comprising in response to a selection of a column header within a spreadsheet, displaying a border around the selected column and displaying the single UI handle element at an edge of the selected column header.

14. The computer-readable medium of claim 9, further comprising in response to a selection of a row header, displaying a border around the selected row and the single UI handle element at an edge of the selected row.

15. A system for selecting content, comprising:

a display that is configured to receive touch input;

a processor and memory;

an operating environment executing using the processor;

a display showing selectable content; and a selection manager that is configured to perform actions comprising:

determining when content is initially selected;

in response to determining that content is initially selected, displaying a single user interface (UI) handle element near a corner of the selection;

receiving an update to the area of the selection using the single UI element, wherein the single UI handle element is moved across other content; and in response to receiving the update to the area:

displaying a single UI handle element at a first edge of the updated area of the selection; and displaying a second UI handle element near a second edge of the updated area of the selection, wherein the single UI handle element and the second UI handle element are used to adjust the updated area of the selection of content.

16. The system of claim 15, further comprising displaying a border around the selection and using at least one of the edges of the border as an additional handle element.

17. The system of claim 15, further comprising in response to a selection of a column header within a spreadsheet, displaying a border around the selected column and displaying the single UI handle element at an edge of the selected column header.

18. The system of claim 15, further comprising in response to a selection of a row header, displaying a border around the selected row and the single UI handle element at an edge of the selected row.

19. The method of claim 1, wherein the area of the selection is changed by moving the single UI handle element across a cell, wherein the single UI handle element moves in at least one of the following directions: up, down, left, right, and diagonally.

20. The system of claim 15, wherein the selection is a selection of content comprising any one of a cell or an element of a table.

\* \* \* \* \*